United States Patent [19]

Da Silva

[11] 4,105,893
[45] Aug. 8, 1978

[54] APPARATUS AND METHOD FOR TREATING SUGAR CANE STUMPS

[75] Inventor: Wilson Marcelo Da Silva, Sao Paulo, Brazil

[73] Assignee: Cooperativa Central Dos Productores de Acucar e Alcool do Estado de Sao Paulo, Sao Paulo, Brazil

[21] Appl. No.: 737,105

[22] Filed: Oct. 29, 1976

[51] Int. Cl.² ............................................. H05B 1/00
[52] U.S. Cl. .................................. 219/316; 219/297; 219/310; 219/328; 219/331
[58] Field of Search ............... 219/296, 297, 310, 312, 219/316, 331, 523, 320, 328; 4/178, 179, 180; 354/299, 324; 21/85, 87, 89, 90, 92, 93, 99, 100; 134/58 D, 58 R; 128/369, 370, 365, 403

[56] References Cited

U.S. PATENT DOCUMENTS

| | | | |
|---|---|---|---|
| 1,896,953 | 2/1933 | Hassell | 219/331 X |
| 2,993,108 | 7/1961 | Haake | 219/331 X |
| 3,239,649 | 3/1966 | Reeve | 219/316 X |
| 3,382,346 | 5/1968 | Brever et al. | 219/331 |

*Primary Examiner*—C. L. Albritton
*Attorney, Agent, or Firm*—Emory L. Groff, Jr.

[57] ABSTRACT

An apparatus for the treatment of sugar cane gemmas for the control of the blight of sugar cane stumps left after cutting, comprises an insulated tank in which the gemmas are placed to be treated. The trays are submerged in water which is maintained at a controlled temperature. The water is circulated among the trays by an electrically operated pump and appropriate piping.

3 Claims, 3 Drawing Figures

APPARATUS AND METHOD FOR TREATING SUGAR CANE STUMPS

This invention relates to an apparatus for the treatment of sugar cane gemmas for the control of the blight of sugar cane stumps left after cutting.

The object of the invention is to provide an apparatus for the treatment of sugar can gemmas for the control of the blight of sugar cane stumps left after cutting, by which the sugar cane gemmas (seeds) are in culms cut in disc-shape and submerged in water for a certain time. The gemmas are disposed in horizontal superposed trays and subjected to a circulation of water. This manner of treatment of gemmas is utterly new, replacing advantageously the traditional methods by which such treatment was made on the whole culm or on small tholes including one or more internodes and respective gemmas.

Other objects, uses and advantages of this invention will become apparent from the disclosure hereinafter set forth with particular reference to the accompanying drawings forming a part thereof and wherein like numerals describe like parts in which.

Figure 3:
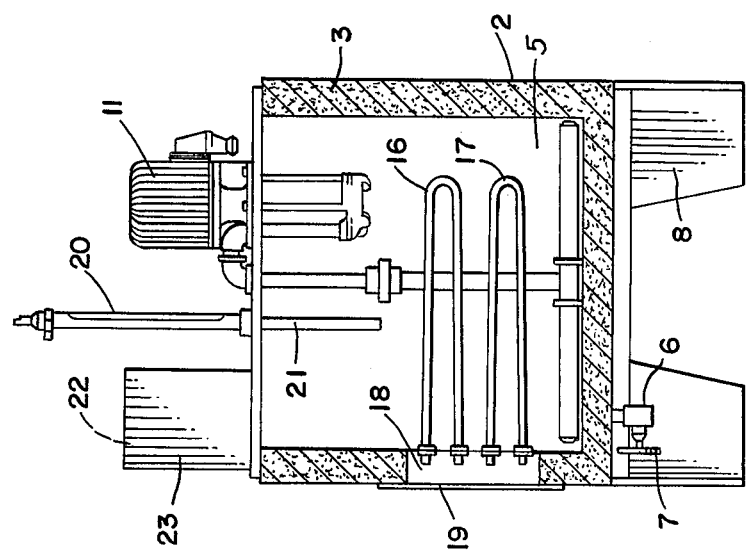
FIG. 2 is a plan view of the apparatus of the invention and FIG. 3 is a cross sectional view of the apparatus of the invention taken on line B—B of FIG. 2.
Figure 2:
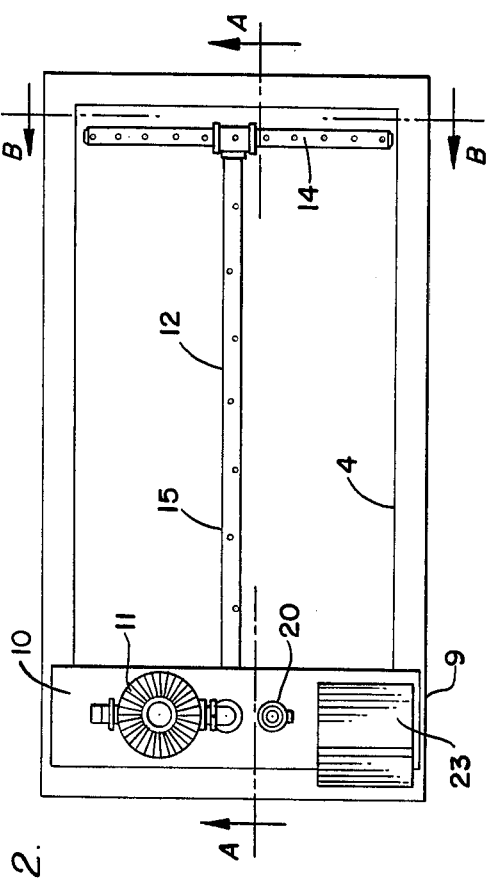

The device as shown in the drawings is essentially characterized by a tank 1 preferably rectangular-shaped with upright outside walls 2 of an adequate thickness. Inside of these walls 2 is a layer of glass wool 3 or equivalent for the thermal insulation of the tank. Internal side walls 4 are provided on the inner sides of the insulation. The bottom wall 5 is provided with a drain 6 having a control valve 7. Supporting feet 8 keep the tank above the floor at a convenient high. On an upper end portion 9 of the tank, a supporting plate 10 is provided to support a unit for the pumping of the water in the interior of the tank, a unit for heating the water and a unit for the control of the temperature. An electric immersion pump 11 is mounted on plate 10 to pump the water through a centrally located tube 12 having an upright portion and a horizontal portion disposed along the length of the tank near its bottom 13 and connected, at its opposite end, with a transverse tube 14 near the opposite wall of said tank. The tube portions are provided with holes 15 for the passage of the water. Two U-shaped electric resistance heating elements 16 and 17 are mounted on the side wall of the tank and are accessible from outside by means of an opening 18 having a lid 19 in said wall. A thermostatic control thermometer 20 is mounted on said supporting plate 10 and has an immersion rod 21 extending into the tank. Said thermometer is arranged to control a relay 22 provided in the interior of a box 23 mounted on said supporting plate. Said relay is connected to control the electric resistance 17 and the electric pump 11.

Figure 1:
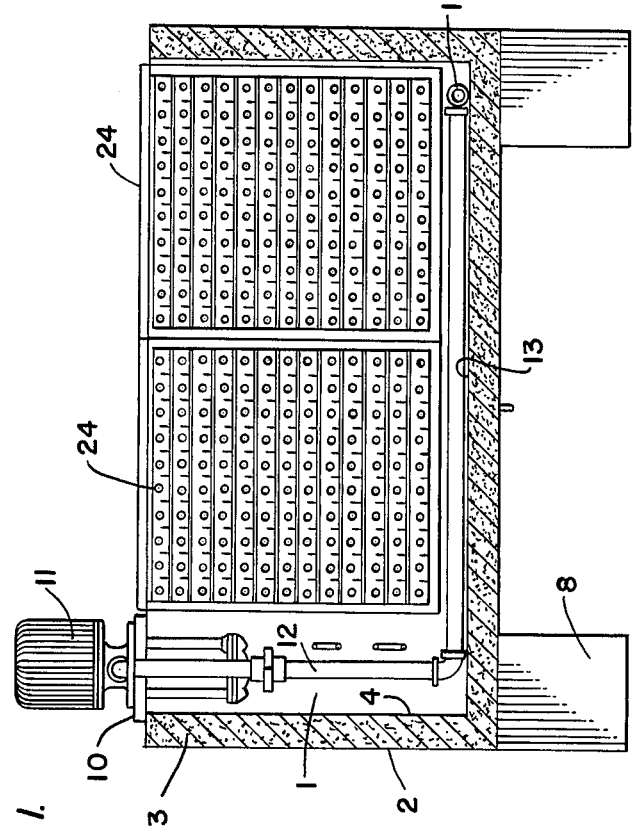
FIG. 1 is a sectional view taken on line A—A of FIG. 2 of the apparatus of the invention.

In the use of this apparatus, the sugar cane gemmas to be given a therapeutic treatment to control blight, are in culms and are placed in trays 24 which are placed in the tank 1, as shown in FIG. 1. The tank is filled with water at a temperature critically chosen to treat the gemmas. The thermometer 20 with its immersion rod 21 controls the heat supplied by the heating elements 16, 17, and also controls the pump 11 which circulates the water among the gemmas to maintain the temperature of the entire pool of water constant in the tank. The main advantage of this apparatus lies in permitting, in association with said horizontal trays 24, the accomplishment of a thermotherapeutic treatment, in an industrial equipment of comparatively small dimensions, with a comparatively small amount of water in circulation, the perfect control of the uniformity of heating of the water in every quarter, having in mind an equal and sufficient distribution and penetration of the heat in the trays and gemmas under thermotherapy. From a technical viewpoint this apparatus has a distinct advantage, considering that, as known, this treatment must take place under temperature conditions of very little tolerance, measured in tenths of degrees. Otherwise the immediate destruction of the gemmas under treatment would occur.

Obviously this thermotherapic unit such as described and illustrated may vary in secondary constructive details, and even in equivalent elements, without departing from the body and spirit of the invention precisely claimed in the claims constituting a complemental part of the present specification.

I claim:

1. In a thermotherapeutic apparatus using water for the treatment of sugar cane stumps left after cutting, a tank of a given depth having upright peripheral walls and a bottom wall, said walls being provided with a layer of material for thermal insulation, said bottom wall having a drain provided with a valve, supporting feet connected with said tank, a supporting plate mounted on one end of the tank, an electric immersion pump mounted on said plate, an upright central tube extending from said pump, a tube extending from said upright tube disposed along the length of the tank near its bottom, and connected, at its opposite end, with a transverse tube near the opposite end of the tank, said tubes being provided with holes for the passage of water, two U-shaped electric resistance heating elements mounted on one lateral wall of the tank and accessable from the outside by means of an opening with a lid in said wall, a thermostat comprising a thermometer mounted on said plate provided with an immersion rod, a box containing a relay mounted on said supporting plate, said relay being controlled by said thermostat to control said resistance heating elements and said pump.

2. Apparatus for treating sugar cane stumps to control blight, comprising, an insulated tank adapted to receive trays of said stumps to be treated, pump and conduit means for circulating fluid of a preselected temperature in said tank for treating said stumps, heating means for maintaining said fluid at said preselected temperature, and thermostatic means responsive to the temperature of said fluid for controlling said heating means and said pump for maintaining said preslected temperature.

3. Method for treating sugar cane stumps left after cutting to control blight, comprising, placing said stumps in a tank, submerging said stumps in a fluid, circulating said fluid among said stumps, and maintaining the temperature of said fluid at a value to control blight.

* * * * *